United States Patent [19]

Gurth

[11] Patent Number: 4,773,819

[45] Date of Patent: * Sep. 27, 1988

[54] ROTARY DISC SLURRY PUMP

[76] Inventor: Max I. Gurth, 1781 Carob Tree La., El Cajon, Calif. 92021

[*] Notice: The portion of the term of this patent subsequent to Apr. 30, 2002 has been disclaimed.

[21] Appl. No.: 912,215

[22] Filed: Sep. 26, 1986

Related U.S. Application Data

[63] Continuation of Ser. No. 261,630, May 7, 1981, which is a continuation-in-part of Ser. No. 166,185, Jul. 7, 1980, Pat. No. 4,335,994, which is a continuation of Ser. No. 938,223, Aug. 30, 1978, abandoned, and Ser. No. 166,186, Jul. 7, 1980, abandoned, which is a continuation of Ser. No. 938,224, Aug. 30, 1978, abandoned.

[51] Int. Cl.$^4$ ............................................. F04D 11/00
[52] U.S. Cl. ....................................... 415/90; 415/206
[58] Field of Search ............... 415/76, 90, 213 C, 206; 416/4

[56] References Cited

U.S. PATENT DOCUMENTS

| | | | |
|---|---|---|---|
| 1,013,248 | 1/1912 | Wilkinson | 415/90 |
| 1,489,571 | 4/1924 | Wright | 415/206 X |
| 2,087,834 | 7/1937 | Brown et al. | 415/90 X |
| 2,490,066 | 12/1949 | Kollsman | 415/90 |
| 3,273,865 | 9/1966 | White | 415/90 X |
| 3,323,464 | 6/1967 | Benton et al. | 415/213 R |
| 3,487,784 | 1/1970 | Rafferty | 415/76 X |
| 4,335,994 | 6/1982 | Gurth | 415/90 |

FOREIGN PATENT DOCUMENTS

| | | | |
|---|---|---|---|
| 2592 | 6/1979 | European Pat. Off. | 415/90 |
| 1461776 | 1/1977 | United Kingdom | 415/90 |

Primary Examiner—Robert E. Garrett
Assistant Examiner—Joseph M. Pitko
Attorney, Agent, or Firm—Baker, Maxham & Jester

[57] ABSTRACT

A pump for pumping a slurry includes a rotary pump having a plain disc impeller disposed in a cylindrical chamber of a housing with an inlet coaxial of the impeller into the housing and a substantially square outlet from the periphery of the chamber, with the rotor arranged to provide a substantially unobstructed passage between the inlet past the rotor to the outlet of the pump.

27 Claims, 1 Drawing Sheet

U.S. Patent
Sep. 27, 1988
4,773,819
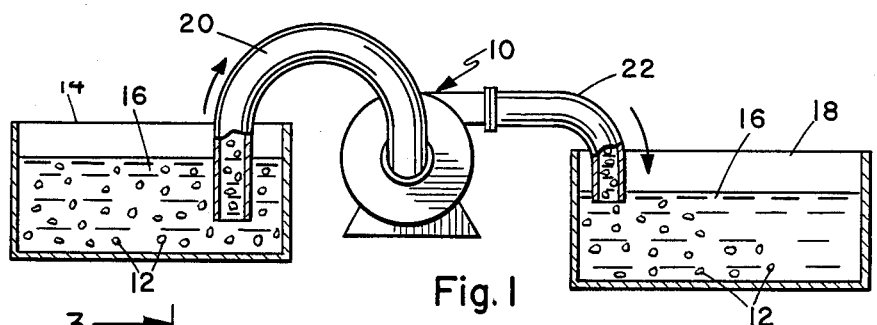
Fig. 1
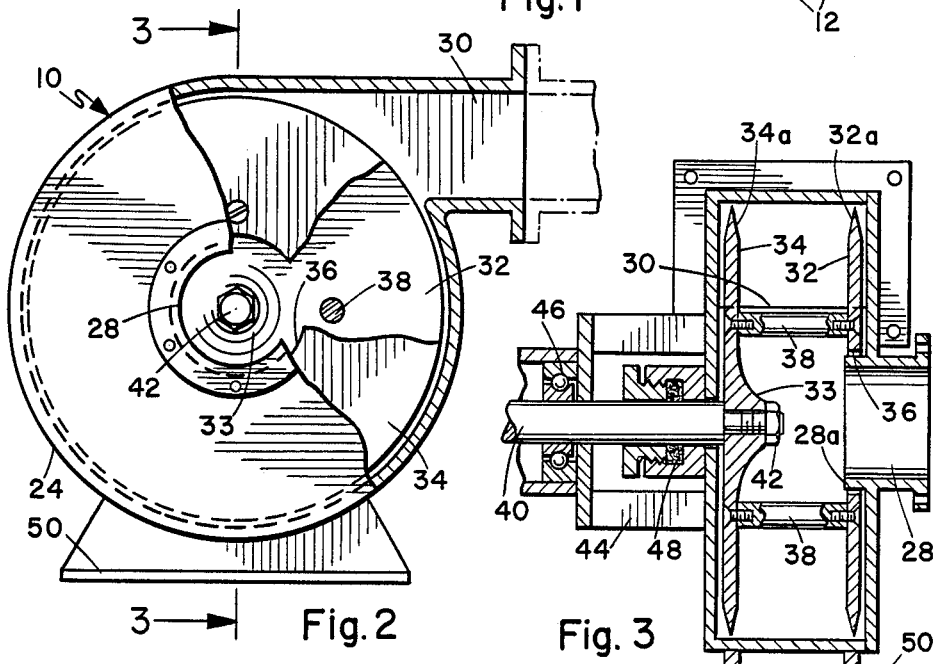
Fig. 2
Fig. 3
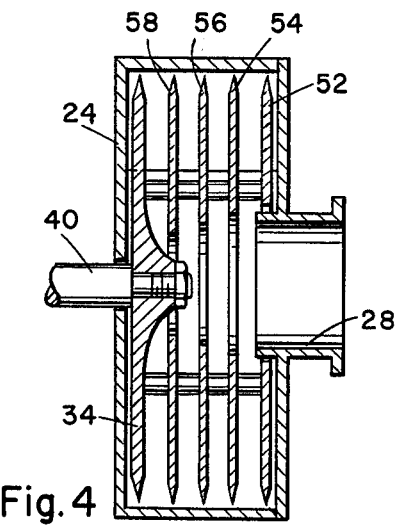
Fig. 4
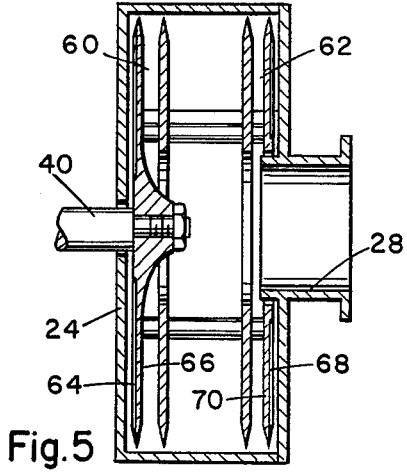
Fig. 5

ROTARY DISC SLURRY PUMP

REFERENCE TO RELATED APPLICATIONS

This application is a continuation of my prior co-pending application Ser. No. 261,630, filed May 7, 1981; which is a continuation-in-part of my prior co-pending application Ser. No. 166,185, filed July 7, 1980, now U.S. Pat. No. 4,335,994, granted June 22, 1982; which was a continuation of Ser. No. 938,223, filed Aug. 30, 1978, now abandoned, which Ser. No. 166,186, filed July 7, 1980, now abandoned, which was a continuation of Ser. No. 938,224, filed Aug. 30, 1978, now abandoned.

BACKGROUND OF THE INVENTION

The present invention relates to fluid pumps and pertains particularly to method and apparatus for pumping slurries, and articles in a liquid.

Rotary disc pumps have been known for some time. These pumps, however, have not gained widespread use, because of low efficiency. They have been unable to compete effectively with positive displacement pumps and bladed impeller pumps for the pumping of fluids.

These pumps are all based on the theory that the friction of the fluid on the surfaces of the plates of the rotor during rotation of the rotor develops a centrifugal force propelling the fluid out toward the periphery of the plates. These all, however maintain and recognize the necessity for maintaining a fairly close tolerance of the spacing between the discs. There has long existed a need for systems for conveying slurries and articles in a fluid rapidly and conveniently without damage thereto. Fruits and vegetables, for example, are currently conveyed by means of screw-type conveyors when it is essential to convey them without a fluid medium. Prior to the present invention, there has been no known technique for conveying such articles by means of a pump in a fluid medium without damage thereto.

Vane type pumps are also used in the pumping of coal slurry and the like. Such pumps, while effective in moving the slurry, are subjected to high wear and rapid deterioration. They are also subject to clogging.

It is therefore desirable that a pump be available which is capable of rapidly and effectively conveying articles by means of a fluid medium over a reasonable distance.

SUMMARY AND OBJECTS OF THE INVENTION

It is accordingly the primary object of the present invention to provide an improved disc pump.

In accordance with the primary aspect of the present invention, a pump is provided for moving of slurries and fragile articles, with the pump comprising a plain disc impeller with a substantially unobstructed passage between the inlet and outlet of the pump. The fluid is pumped through the pump by means of friction and shear forces applied thereto by means of a plain disc impeller, with the fragile articles being carried along in the fluid stream without impact with portions of the pump assembly.

BRIEF DESCRIPTION OF THE DRAWINGS

The above and other objects and advantages of the present invention will become apparent from the following description when read in conjunction with the drawings, wherein:

FIG. 1 is a diagram of a typical use of the pump for moving a slurry, or the like.

FIG. 2 is a front elevation view of the pump, with portions cut away.

FIG. 3 is a sectional view taken on line 3—3 of FIG. 2.

FIG. 4 is a side elevation partial view in section of an alternative form of the pump.

FIG. 5 is a partial sectional view of a further embodiment.

DETAILED DESCRIPTION OF A PREFERRED EMBODIMENT

Turning now to the drawings, particularly to FIG. 1, there is illustrated a pump, designated generally by the numeral 10, pumping a slurry of articles 12 from a tank 14 in a fluid 16 such as water into a second tank 18. The second tank also contains fluid 16 such as water. The pump is provided with an inlet conduit 20 of sufficient size to convey the fish and fluid without damage to the fish into the pump 10, and therethrough and by way of an outlet conduit 22 into the second tank 18.

As best seen in FIGS. 2 and 3, the pump 10 includes a housing 24 having a generally cylindrical chamber 26 in which is mounted a disc rotor. The housig includes an inlet 28 into the chamber 26 and an outlet 30 from the periphery of the chamber 26.

As best seen in FIG. 3, the pump rotor includes a first plain disc 34 having a plane impelling surface and a substantially conical-shaped streamlining portion 33 projecting toward and concentric with the inlet 28 and the axis of the chamber 26. A second plain disc 32, also of plane configuration includes a central opening 36 concentric with and substantially the same diameter of the inlet 28. The second disc 32 is connected to the inner or drive disc 34 by means of a plurality of pins 38 spaced around the axis and closely adjacent thereto. These pins are preferably as close to the central axis of the rotor as possible. This spacing is critical in the handling of fragile articles in that the movement of fluid and articles through the chamber is such that the velocity of the articles at this point is fairly low and will tend to be moving at about the same velocity and direction as the pins such that impact therewith is substantially avoided. This configuration as shown, for example, in FIGS. 2 and 3, provides an essentially unobstructed passage through the pump housing from the inlet 28 to the outlet 30. The spacing between the discs 32 and 34 should exceed the maximum dimension of the articles to be pumped in order to insure adequate spacing for unobstructed passage of an article of a predetermined size. The spacing between the discs should be related to the diameter of the disc, and preferably should be no greater than the outer diameter of the disc.

Prior plain disc pumps have emphasized the necessity of close spacing between the discs in the pump. Heretofore, the spacing of such pumps, typically referred to as shear force pumps, has been considered to be fairly critical. It has always been considered necessary in the past to have a fairly close spacing between the discs in order to get the necessary shear force to propel the fluid through the pump.

Applicant has discovered that large spacing between the discs is possible and of from ½ an inch up to at least as much as a foot or more. Applicant has essentially discovered a pump construction and method capable of pumping highly abrasive slurries with very little wear on the pump. It can also pump fragile articles such as live fish and the like, from one place to another such as from one tank to another, from a fishing vessel to the processing tanks, and the like, without damage to the articles. Fresh fruits and vegetables can also be pumped without damage.

The rotor of the pump in FIG. 3 is mounted on a suitable drive shaft 40 such as by means of a nut 42. The drive shaft is mounted in a bearing support bracket 44 by means of a bearing 46 and includes suitable seal means 48 for sealing the shaft within the housing. The housing is supported on a base member 50 for mounting in the usual manner.

While only two discs are illustrated in FIG. 3, any number may be used. The spacing between the discs must be sufficient to allow passage of the articles being pumped. The efficiency of the pump is enhanced by several features to be described including the configuration of the outlet.

First of all, it is important that the chamber of the housing be cylindrical in configuration with the discs disposed concentrically therein with the outer tips 32a and 34a of the discs be as closely spaced as practical to the cylindrical inner surface of the housing. This spacing is preferably less than one half (½) inche even for large diameter pumps and as close as 50 thousandths (1.25 millimeters) for most applications. For fine particle abrasive materials, this spacing should be as close as from 10 to 20 thousandths (0.25 to 0.50 mm).

The outer tips 32a and 34a of the discs should also be (sharpened to a sharp edge (e.g. knife edge sharpeness) then used for pumping slurries. This substantially eliminates wear and abrasion at the tips.

The outlet 30 of the pump should be substantially square in configuration and extend the full width of the housing inner chamber the outlet 30 also has a height or depth as will be appreciated from FIGS. 2 and 3 that intersects up to about one-half the radius of the discs. This fully exposes the discs to the open outlet and improves efficiency.

The inlet 28 includes an inlet lip or extension 28a that extends through the opening 36 in the inlet side disc 34 and terminates at the inside face thereof. The clearance between the outer surface of lip or extension 28a and bore 36 should be on the order of about 10 thousandths (0.25 mm). This eliminates circulation around the disc 34 and between the side wall of the chamber. The clearance between the outer face of the disc 34 and the chamberwall should also be close, e.g. about 10 to 20 thousandths.

Turning to FIG. 4 wherein identical elements are identified by the same reference numerals, an alternative embodiment is shown. In this embodiment the impeller incudes a plurality of plane discs 52, 54, 56 and 58 wherein the center opening of the discs progressively decrease from the inlet. This configuration also increases the efficiency of the pump. These increase in efficiency also increases the pressure output of the pump as well as rate of flow. The greater the surface area of the disc, the greater the impelling force it will deliver. For this reason, the center opening or diameter should be kept as small as practical relative to the outer diameter, and preferably no more than about one-half the outer diameter.

Turning to FIG. 5, an additional embodiment is illustrated wherein pairs of closely spaced discs are used to further increase pressure. As illustrated, a first pair 60 of closely spaced discs are spaced a greater distance from a second pair 62. The greater surface area provided by the pairs of discs can increase pressure and efficiency. The closer spacing between pairs of pairs of discs increase pressures. The greater spacing between the pairs of discs allow large articles to pass through the pump. Also, closely spaced packs of discs (i.e. 2 or more) can be secured to the drive plate spaced from the inlet to let large articles pass through the pump without passing between the discs.

Additional pressure and efficiency can be gained by providing the time disc 64 (FIG. 5) with a series of radial grooves 66 extending outward along the face adjacent the wall. Similar grooves 68 are provided along the wall side face of the inlet side disc 70. These can be used in pumps for large articles such as fish, fruits and vegetables, etc., but cannot be used for slurries having fine particles. These grooves cover a high degree of abrasion when small particles are present in the fluid.

Another improvement which I find desirable, is a hardened smooth coating, on the interior surface (i.e. in the chamber) of the housing. This improves the efficiency and abrasion resistance.

While I have described my invention by means of specific embodiments, it is to be understood that numerous changes and modifications may be made therein without departing from the spirit and scope of the invention as defined in the appended claims.

Having described my invention, I now claim:

1. A rotary disc incompressible fluid pump for pumping an incompressible fluid medium, said pump comprising in combination:

a housing, having a pair of circular end walls disposed in spaced apart parallel planes and connected together by a peripheral wall defining a cylindrical rotor chamber having a constant radius at any selected plate between said end walls;

an inlet formed in one of said end walls coaxially of said chamber, an outlet having a rectangular cross sectional configuration and a width equal to the width of the chamber communicating with and extending tangently outwardly from the peripheral wall of said housing at the outer diameter of said chamber, and a rotary disc impeller coaxially mounted in said chamber for rotation therein and comprising a plurality of coaxially disposed discs each defined by opposed continuous planar faces and an outer diameter no more than about ten percent less than the diameter of the rotor chamber and a central opening coaxially thereof defining an inner diameter, said discs are connected together closely adjacent said inner diameter, and mounted for rotation about their axis and positioned for contact with fluid in said chamber, and the planar faces of said discs defining the impelling force on said fluid and being spaced apart sufficient to permit the passage of fluid borne articles from said inlet through said central opening and between at least some of said discs to the outlet, and means connecting said second disc to said first disc for rotation therewith and defining with the inner surfaces of said discs and said housing peripheral wall an unobstructed annular chamber of uniform cross-sectional shape extending radially outward therefrom for conveyance of said articles from said inlet to said outlet.

2. The pump of claim 1 wherein said spacing between said discs is greater than one half inch.

3. The pump of claim 3 wherein the spacing between said discs is greater than six inches.

4. The pump of claim 2 wherein said impeller includes a first disc adjacent said inlet, said inlet includes a lip extending through the bore of said first disc to the inner face thereof.

5. The pump of claim 4 wherein said first disc is spaced from about ten to about twenty thousandths from the side wall of said chamber, and
the outer tips of all of said discs are sharpened to a sharp edge.

6. The pump of claim 5 wherein the outer tip of each of said discs is spaced less than 50 thousandths from the wall of said chamber.

7. The pump of claim 6 wherein the outer tips of said discs are each sharpened to a knife edge sharpness.

8. The pump of claim 8 wherein said outlet is substantially square in configuration.

9. The pump of claim 8 wherein pairs of said discs are spaced closely and said pairs are spaced greater than ½ inch from adjacent pairs of discs.

10. The pump of claim 5 wherein the surface of said first disc adjacent said side wall includes a plurality of radial grooves extending to the outer tip thereof.

11. A rotary disc incompressible fluid pump for pumping an incompressible fluid medium, said pump comprising in combination:
a housing, having end walls and a peripheral wall defining a substantially cylindrical rotor chamber having a substantially constant radius at any selected position along the axis of said chamber;
one of said end walls including means defining an inlet coaxially of said chamber;
an outlet having a rectangular cross-sectional configuration, a width equal to the width of the chamber and a height of at least one-third the radius of said chamber communicating with and extending tangently outwardly from the peripheral wall of said housing at the outer diameter of said chamber, and
a rotary disc impeller coaxially mounted in said chamber for rotation therein and comprising a plurality of coaxially disposed planar discs each disc defined by opposed continuous planar faces and an outer diameter no more than about ten percent less than the diameter of the rotor chamber and a central opening coaxially thereof defining an inner diameter, said discs mounted for rotation about their axis and positioned for contact with fluid in said chamber, and said planar faces defining the impelling force on said fluid and said discs are spaced apart sufficient to permit the passage of fluid borne articles from said inlet through said central opening and between at least some of said discs to the outlet, and means connecting said second disc to said first disc for rotation therewith and defining with the inner surfaces of said discs and said housing peripheral wall an unobstructed annular chamber of uniform cross-sectional shape extending radially outward therefrom for conveyance of said articles from said inlet to said outlet.

12. The pump of claim 11 wherein said impeller includes a first disc adjacent said inlet, said inlet includes a lip extending through the bore of said first disc to the inner face thereof.

13. The pump of claim 12 wherein the outer tips of said discs are each sharpened to a knife-edge sharpness.

14. The pump of claim 12 wherein said first disc is spaced from about ten to about twenty thousandths from the side wall of said chamber, and
the outer tips of all of said discs are sharpened to a sharp edge.

15. The pump of claim 14 wherein said spacing between said discs is greater than one-half inch.

16. The pump of claim 15 wherein the spacing between said discs is greater than six inches.

17. The pump of claim 14 wherein the outer tip of each of said discs is spaced less than 50 thousandths from the wall of said chamber.

18. The pump of claim 11 wherein said outlet is substantially square in configuration.

19. A rotary disc pump for pumping articles in an incompressible fluid medium, comprising in combination:
a housing having means including a pair of spaced apart generally parallel walls and a peripheral wall defining a rotor chamber having an axis;
an inlet in one of said walls coaxial of said chamber;
an outlet communicating with and extending outwardly tangentially from the peripheral wall at the outer diameter of said chamber; and
a rotary impeller coaxially mounted for rotation in said chamber and comprising a rotor shaft rotatably mounted in the wall opposite said inlet, a first planar disc having a planar face mounted on said shaft for contact with fluid in said chamber, and a second planar disc defined by opposed planar faces and a central opening and spaced from the first disc sufficient to permit the passage of articles of at least one quarter inch in major dimension from said inlet through the opening in said second disc and between said disc to the outlet, and means connecting said second disc to said first disc for rotation therewith and defining with the inner surfaces of said discs and said housing peripheral wall an unobstructed annular chamber of uniform cross-sectional shape extending radially outward therefrom for conveyance of said articles from said inlet to said outlet.

20. The pump of claim 19, wherein said second disc of said impeller is spaced from said first disc a distance of at least one-half inch.

21. The pump of claim 19, wherein said second disc is spaced from the first impeller disc a distance of from one-half inch to twenty-four inches.

22. The pump of claim 21 wherein said second discs have in inner diameter that is less than one-half the outer diameter and a spacing therebetween that is less than the outer diameter thereof.

23. The pump of claim 19, including a plurality of said second discs having a central opening therethrough and spaced from one another and said first disc a sufficient distance and said means connecting to said second disc to said first disc for rotation therewith providing a substantially unobstructed passageway from said inlet to said outlet through said openings in said discs and between said discs for the passage of articles including fragile articles of a predetermined size greater than said major dimension.

24. The pump of claim 23, wherein said means connecting said second discs to said first disc comprising a plurality of connecting rods spaced annularly around the axis of the discs said the innermost diameter of the second discs.

25. The pump of claim 19, including vortex reducing means on said inner disc.

26. The pump of claim 25, wherein said vortex reducing means comprises a substantially conical projection extending axially of said disc toward said inlet.

27. The pump of claim 25, wherein said conical projection extends substantially to said inlet.

* * * * *

UNITED STATES PATENT AND TRADEMARK OFFICE
CERTIFICATE OF CORRECTION

PATENT NO. : 4,773,819

DATED : September 27, 1988

INVENTOR(S) : MAX I. GURTH

It is certified that error appears in the above-identified patent and that said Letters Patent is hereby corrected as shown below:

Column 5, Claim 3, line 3, change "3" to --2--.

Column 5, Claim 8, line 18, change "8" to --5--.

Column 5, Claim 9, line 20, change "8" to --5--.

Signed and Sealed this

Fourth Day of April, 1989

Attest:

DONALD J. QUIGG

*Attesting Officer*      *Commissioner of Patents and Trademarks*